(12) United States Patent
Jung

(10) Patent No.: US 10,281,201 B2
(45) Date of Patent: May 7, 2019

(54) SYSTEM AND METHOD FOR TESTING NORMAL OPERATION OF REFRIGERATOR

(71) Applicant: LG ELECTRONICS INC., Seoul (KR)

(72) Inventor: Insung Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 185 days.

(21) Appl. No.: 15/359,205

(22) Filed: Nov. 22, 2016

(65) Prior Publication Data

US 2017/0276426 A1    Sep. 28, 2017

(30) Foreign Application Priority Data

Mar. 22, 2016   (KR) ........................ 10-2016-0033956

(51) Int. Cl.
| | |
|---|---|
| *F25D 29/00* | (2006.01) |
| *F25D 11/02* | (2006.01) |
| *G01M 99/00* | (2011.01) |
| *H04B 5/00* | (2006.01) |
| *H04L 12/28* | (2006.01) |
| *H04L 12/46* | (2006.01) |

(52) U.S. Cl.
CPC ............. *F25D 29/00* (2013.01); *F25D 11/02* (2013.01); *G01M 99/008* (2013.01); *H04B 5/0031* (2013.01); *H04L 12/2803* (2013.01); *H04L 12/4625* (2013.01); *F25D 2400/361* (2013.01)

(58) Field of Classification Search
CPC .... F25D 29/00; F25D 11/02; F25D 2400/361; H04L 12/4625; H04L 12/2803; G01M 99/008
See application file for complete search history.

(56) References Cited

U.S. PATENT DOCUMENTS

| | | | | |
|---|---|---|---|---|
| 7,032,397 | B1* | 4/2006 | Mueller | F25B 49/005 62/230 |
| 2012/0223719 | A1* | 9/2012 | Jo | G01R 31/02 324/500 |
| 2013/0307698 | A1* | 11/2013 | Park | G08C 17/02 340/815.4 |
| 2014/0304126 | A1* | 10/2014 | Kim, II | G06Q 10/087 705/28 |

FOREIGN PATENT DOCUMENTS

| | | |
|---|---|---|
| KR | 10-2012-0100211 A | 9/2012 |
| KR | 10-2015-0072921 A | 6/2015 |

* cited by examiner

*Primary Examiner* — Larry L Furdge
(74) *Attorney, Agent, or Firm* — Dentons US LLP

(57) ABSTRACT

A method for testing a normal operation of a refrigerator, the method including allowing a user to implement an application of a terminal for testing the refrigerator; displaying a list of controllable loads on a display unit of the terminal; allowing the user to select a desired load and input a setting command for the load; implementing a controller of the refrigerator to operate the load according to the setting command received from the terminal via the tag unit; and implementing the terminal to display state information of the operated load on the display unit.

20 Claims, 22 Drawing Sheets

SYSTEM AND METHOD FOR TESTING NORMAL OPERATION OF REFRIGERATOR

Pursuant to 35 U.S.C. § 119(a), this application claims the benefit of earlier filing date and right of priority to Korean Application No. 10-2016-0033956, filed on Mar. 22, 2016, the contents of which are hereby incorporated by reference herein in their entirety.

BACKGROUND OF THE DISCLOSURE

Field of the Disclosure

The present invention relates to a system and a method for testing a normal operation of a refrigerator, using a terminal.

Discussion of the Related Art

A refrigerator is an electric appliance configured to freeze or refrigerator the food stuffs stored in one or more storage compartments by lowering the temperature in the storage compartments, using the cold air generated via the cooling cycle configured of a compressor, a condenser, an expansion valve and an evaporator.

Such a refrigerator typically includes a refrigerator compartment for storing refrigerated food or beverage at a low temperature and a freezer compartment for storing frozen food at a low temperature below zero.

When the refrigerator being used by a user is kaput, the user contacts the Service Center to ask a service visit. A trained service technician visits and puts the refrigerator into overall operation to inspect the refrigerator for failure and to determine which modes or units malfunctions.

Each of the components provided in the refrigerator is generally set and controlled by a controller and it is normal that only one or some specific components cannot be set to be operated.

When the refrigerator fails to be normally operated, it is difficult to figure out which component or unit is malfunctioned without demounting the refrigerator or transferring it to the service center having a test device.

SUMMARY OF THE DISCLOSURE

Exemplary embodiments of the present disclosure provide a system and a method for testing normal operation of a refrigerator which easily determines whether replacement or repair of a malfunctioning component is needed based on the data gained based on the result of the operation after operating the components of the refrigerator in case an error occurs in the refrigerator, using an application downloaded in a terminal.

Embodiments of the present disclosure also provide a system comprising: a refrigerator comprising: a tag unit performing near-field communication (NFC); a refrigerator processor that controls an operation according to an input setting; and a terminal comprising: a terminal communication unit that transceives data with the tag unit by NFC; a terminal display that outputs a list, a controlling method, and a control order of independently operable loads and operational information of each of the independently operable loads; and a terminal processor that transmits the setting data input via the terminal communication unit to the refrigerator and analyzes the data received from the refrigerator, wherein the result of the analyzed data is output on the terminal display.

The tag unit may comprise a tag storage that stores data; and a transceiver that transceives data with the terminal communication unit using NFC.

The refrigerator may further comprise an input unit that receives a control command input by a user; a refrigerator display that displays an operational state of the refrigerator and the control command; a refrigerator communication unit that communicates with an external device; a sensing unit having diverse sensors; and a memory that stores the operation state and data related with the control method of the refrigerator.

When the terminal communication unit is tagged to the tag unit after an independent load test is selected at the terminal, a list of the independently operable loads is displayed on the terminal display.

When the terminal communication unit is tagged to the tag unit after a desired load is selected at the terminal and a corresponding control command is input, the refrigerator processor operates the load according to the input control command.

When the communication unit is tagged to the tag unit after operation of the selected load, the state information of the operated load is displayed on the terminal display.

When the communication unit is tagged to the tag unit after a cycle test is selected at the terminal, the terminal displays a list, a control method, and a control order of controllable loads on the terminal display.

The refrigerator processor operates a compressor and supplies cold air to a freezer compartment of the refrigerator by opening a 3-way valve toward the freezer compartment and then supplies cold air to a refrigerator compartment of the refrigerator by opening the 3-way valve toward the refrigerator compartment, and stores the sensed temperatures of the freezer and refrigerator compartments in a memory of the refrigerator.

When the terminal communication unit is tagged to the tag unit after implementing the cycle test and selecting to check temperature variation on the terminal, the temperature variation of the freezer and refrigerator compartments is displayed on the terminal display.

While transceiving data by the tagging of the communication unit to the tag unit, the terminal vibrates or emits audio.

Embodiments of the present disclosure may also provide a method for testing an operation of a refrigerator comprising: displaying, on a display of a terminal, a list of controllable loads; selecting a desired load from the list of controllable loads and inputting a setting command for the desired load via the terminal, the desired load and input setting command being communicated to a tag unit of the refrigerator via near-field communication (NFC); operating the desired load, via a refrigerator processor, according to the setting command received from the terminal via the tag unit; and implementing, via a terminal processor in communication with the tag unit, the terminal to display state information of the operated load on the display.

The terminal transceives data, via a terminal communication unit, with the tag unit of the refrigerator by NFC.

The terminal is NFC-tagged with the refrigerator to acquire a list of controllable loads provided in the refrigerator, operate the loads according to input setting, and acquire state information of the loads.

When the terminal communication unit is tagged to the tag unit after an independent load test is selected at the terminal, the terminal displays a list of the independently operable loads on the display.

The method may further comprise providing, via the terminal processor, an interface at the terminal display for allowing a user to set an operation and a control method for each load.

The terminal processor processes data related with state information of the operated load into monitoring data and displays the processed monitoring data on the terminal display.

When an error occurs after the setting command for a specific load is input and the specific load is operated with another specific load, the terminal processor controls the terminal display to display a warning message.

When the terminal communication unit is tagged to the tag unit after selecting a cycle test at the terminal, the terminal displays a list, a control method, and a control order of controllable loads on the terminal display.

The refrigerator processor operates a compressor by controlling a 3-way valve to open toward the freezer compartment to supply cold air to a freezer compartment, controlling the 3-way valve to open toward the refrigerator compartment to supply cold air to a refrigerator compartment, and storing the sensed temperatures of the freezer and refrigerator compartments in a memory of the refrigerator.

When the terminal communication unit is tagged to the tag unit after implementing the cycle test and selecting to check temperature variation on the terminal, the temperature variation of the freezer and refrigerator compartments is displayed on the terminal display.

According to the system and a method for testing the normal operation of the refrigerator, the user is able to easily determine whether replacement or repair of a malfunctioning component is needed based on the data gained based on the result of the operation after operating the components of the refrigerator in case an error occurs in the refrigerator, using the application downloaded in a terminal.

Furthermore, the terminal guides the user how to use the testing system and gives him or her a warning in case of inputting a setting for the component with an error. Accordingly, the user is able to control the load test of the refrigerator easily and errors which might be generated during the testing can be prevented.

Still further, the user who is typically a trained service technician is able to shows a customer the result of the normal operation test as monitoring data and AS reliability may be enhanced accordingly.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

BRIEF DESCRIPTION OF THE DRAWINGS

The present invention will become more fully understood from the detailed description given herein below and the accompanying drawings, which are given by illustration only, and thus are not limitative of the present invention, and wherein.

DESCRIPTION OF SPECIFIC EMBODIMENTS

Description will now be given in detail according to exemplary embodiments disclosed herein, with reference to the accompanying drawings.

Figure 1:
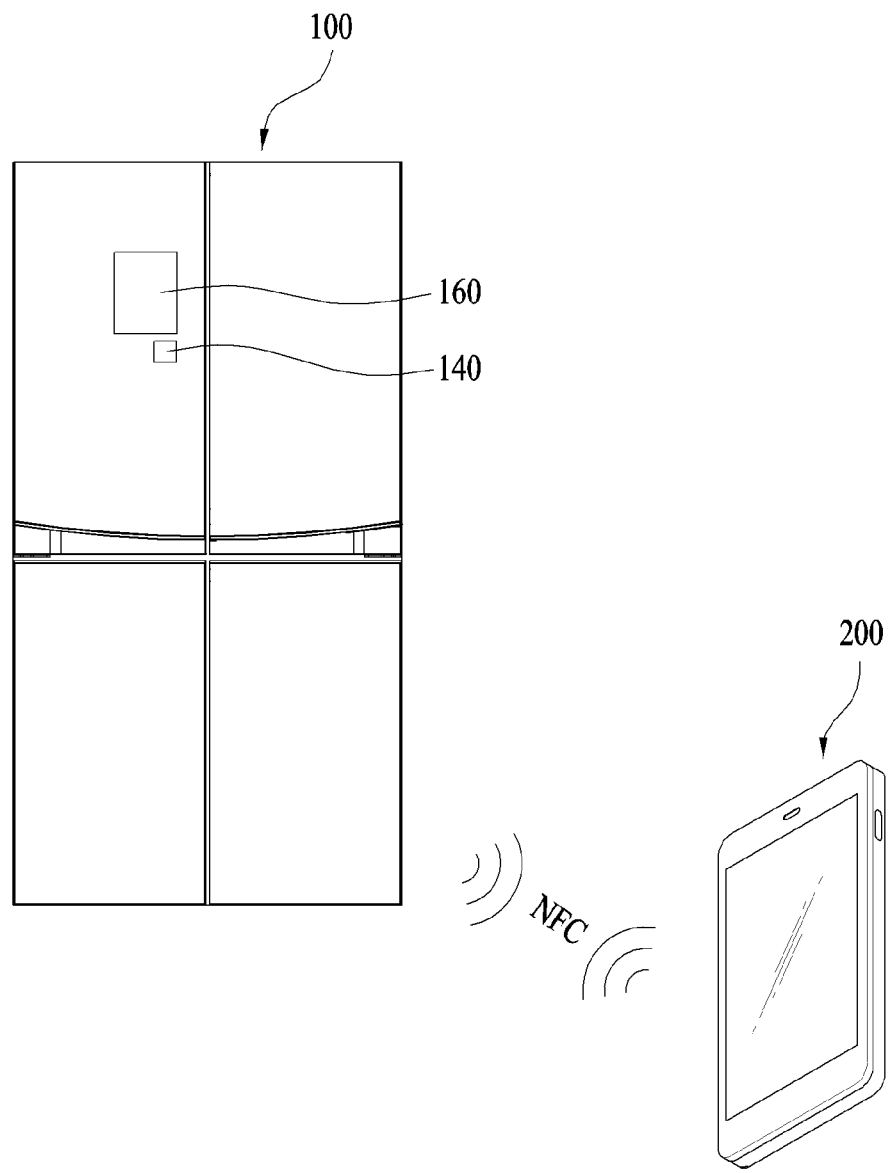
FIG. 1 is a diagram illustrating a system for testing a normal operation of a refrigerator in accordance with one embodiment.

FIG. 1 is a diagram illustrating a system for testing a normal operation of a refrigerator in accordance with one embodiment of the present disclosure.

The example of the system includes a refrigerator 100 and a terminal 200. The terminal 200 may be the auxiliary terminal manufactured to control and test the operation of the refrigerator and it is preferred that the terminal is a smart phone in which an application for testing a normal operation of the refrigerator is installed.

The refrigerator 100 usually includes a refrigerator compartment and a freezer compartment as the storage compartment. According to the arrangement type of the refrigerator and freezer compartments, the refrigerators may be classified into a top mount type having the freezer compartment mounted on a top of the refrigerator, a bottom freezer type having the freezer compartment mounted in a bottom of the refrigerator and a side by side type having the freezer and refrigerator compartments arranged side by side.

The freezer and refrigerator compartments are open and closed by doors, respectively, and door switches are installed in the doors, respectively, to sense the door opening. When the door switch senses the door opening, a lighting device installed in the freezer or refrigerator compartment is turned on.

The refrigerator may further include a chiller of which the temperature is kept in a range of temperatures between the freezing temperature and the refrigerating temperature; and an ice-making chamber for making ice by freezing water.

A dispenser for providing water or water and ice may be provided in the door or storage compartment of the refrigerator. The dispenser is connected to a water pipe and filters the water supplied from a water supply service to provide the water to the user or cools the water to provide the cold water. In case of having the ice-maker, the refrigerator may provide ice to the user.

As illustrated in FIG. 1, a display unit 160 displaying operational states of the refrigerator and a tag unit 140 performing short range wireless communication or NFC (Near Field Communication) with the terminal 200 may be provided in the door.

NFC (Near Field Communication) allows data transmitted or received by tagging the terminal 200 to the tag unit 140 of the refrigerator, in other words, by NFC-tagging. Generally, NFC is implemented in a short range of 10 cm or less and it is less likely to leak personal information, because the communicable range is quite short.

RFID (Radio Frequency Identification) means that a reader is configured to read and decode the information provided by a tag and it is allowed in RFID that information is transmitted to the reader from the tag one-sidedly.

In contrast, it is allowed in NFC that data is transceived between the tag unit and the terminal.

Accordingly, the terminal is able not only to receive data about operational states from the refrigerator by NFC-tagging but also to transmit input data about a control command to the refrigerator.

Figure 2:
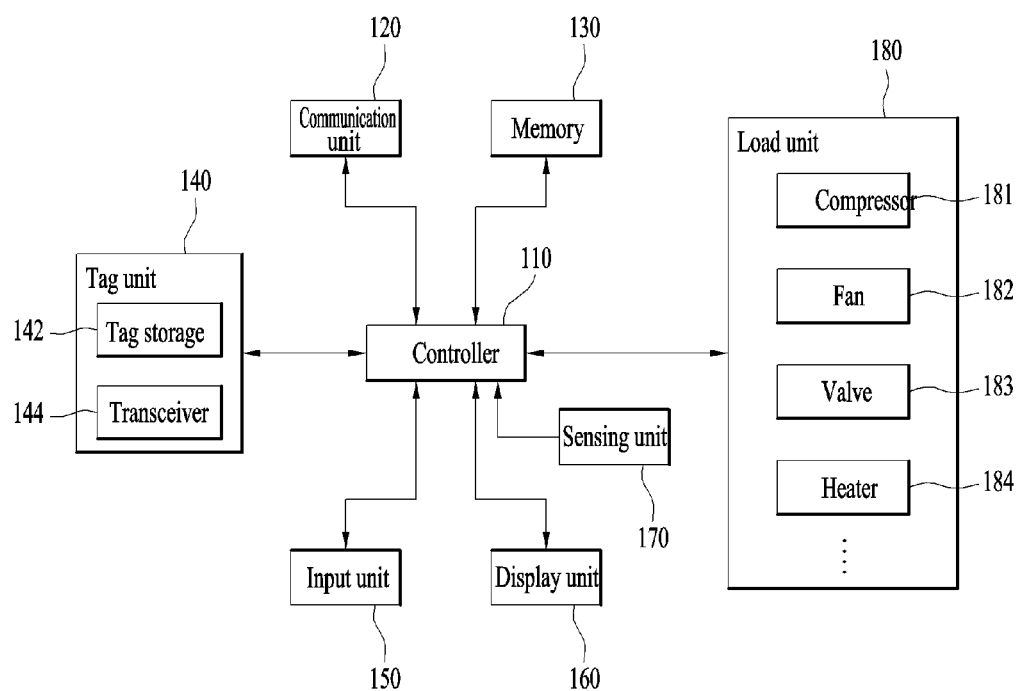
FIG. 2 is a schematic diagram illustrating a configuration of the refrigerator.

FIG. 2 schematically illustrates the structure of the refrigerator.

The refrigerator 100 includes a controller 110 controlling overall operations of the refrigerator as well as the tag unit 140 and the display unit 160 and the other components of the refrigerator.

The refrigerator further includes a communication unit 120 for communicating with an external device; a memory 130 for storing data about the operational states or controlling method of the refrigerator; an input unit 150 having one or more input means to input preset data to the controller 110; a sensing unit 170 sensing or measuring data such as the temperature, pressure, rotation number, voltage and currents in the refrigerator; and a load unit 180 as assembly of diverse loads that are operable by energy.

The communication unit 120 may be connected with external internet network via wire or wirelessly and a plurality of communication modules may be provided according to the communication method.

The input unit 150 includes one or more input means and transmits a control signal input to the input means to the controller 110.

The input means may include a button, a dome switch, a touch pad, a jog wheel, jog switch, a finger mouse, a rotary switch, a jog dial and the like. Any devices may be applicable, only if capable of generating preset input data by manipulation such as pushing, rotation, pressure and touch, and a predetermined number of input means may be provided.

A display such as LCD and LED may be provided as the display unit 160 or a touch screen may be provided as the display unit 160. In case of being provided as the display unit 160, such a touch screen is able to function as the display unit as well as the input unit.

Basic data related with the refrigerator, control data for controlling the operation, the data input via the input unit 150 and data related with information about states of the refrigerator may be stored in the memory 130.

The memory 130 may include one or more magnetic disk, a flash memory device or a non-volatile memory. The examples of the memory 130 are not limited thereto and the memory 130 may include a readable storage media. For example, the memory 130 may include EEP-ROM (Electronically Erasable and Programmable Read Only Memory) and the example is not limited thereto. Information writing or erasing of Such EEP-ROM is performed by the controller 110. It is preferred that EEP-ROM is the memory device configured to keep, not erase, the information memorized in the EEP-ROM even if the power supply is shut off.

The tag unit 140 includes a tag storage 142 for storing data; and a transceiver unit 144 performing data transmission with the terminal 200 or the controller 110.

The tag unit 140 may display contact with the terminal in case of NFC-tagging and set states of data according to a corresponding plug that is set to new data.

The data received from the terminal 200 and recorded and the data of the refrigerator recorded by the controller may be stored in the tag storage 142 independently. For example, in the tag storage 142 may be stored the setting data for the controller to change the settings of the refrigerator operation, control data for controlling the operation, refrigerator state data and data for testing the refrigerator.

The transceiver 144 may transmit the data stored in the tag storage 142 in contacting with the terminal 200 or store the received data in the tag storage 142. At this time, the transceiver 144 may communicate with the terminal 200 according to types of NFC.

The tag unit 140 may be operated, independent from the operation of the refrigerator, even when the power of the refrigerator is shut off. The tag unit 140 may the data transceived in the state where the operation of the refrigerator is stopped to the controller 110, when the refrigerator is put into operation.

The sensing unit 170 may diverse sensors measuring data such as the temperature, pressure, vibration, sound, rotation number, voltage, currents. The sensing unit 170 measures the information about the operation and state of the refrigerator via the sensors, only to transmit the measured information to the controller 110.

In addition, the sensing unit 170 may further include the sensing means sensing sound or a person approaching the refrigerator. For example, when a person is approaching the door of the refrigerator, the sensing unit 170 senses the person so that the door may automatically become transparent to make the internal space be visible or that the door may become transparent or water or ice may come out from the dispenser by recognizing a voice command, using specific sound.

The controller 110 is implemented to process the data input and output via the input unit 150 and the display unit 160 and control the communication between the terminal and the refrigerator via the communication unit 120. Also, the controller 110 controls the refrigerator to be operated according to the setting. It controls the refrigerator according to the data measured or sensed by the sensing unit 170 and notice certain load to the user by determining whether a normal operation is performed in the refrigerator.

The controller 110 senses a current state of the tag unit 140. When determining that there is new data in the tag unit 140, the controller 110 receives the presence of the new data and changes or controls the operation setting of the refrigerator. Hence, the controller 110 transmits preset data that is required by the tag unit 140 and the data collected during the operation of the refrigerator for the tag unit 140 to store the data.

The load unit 180 means the assembly of the parts or components operated by the power provided to the refrigerator 100. Examples of the parts or components include a compressor 181, a fan 182, a valve 183, a heater 184, a damper and the like.

The compressor 181 is a part of a cooling cycle. Such a cooling cycle typically consists of a compressor, a condenser, an expander and an evaporator. The compressor compresses a gaseous refrigerant by rotating a compressor motor. While circulating in the cooling cycle, the air near the evaporator is cooled enough to make cold air. The cold air is supplied to the storage compartments. One compressor or a plurality of compressors as the compressor 181 may be provided in a large-capacity refrigerator to chill the plurality of the storage compartments.

The fan 182 may include a blowing fan provided in an evaporator for the refrigerator compartment; a blowing fan provided in an evaporator for the freezer compartment; an ice-making fan for supplying cold air to a tray of the ice-maker; a blowing fan for circulating air to a path in which a filter for air purification is installed; a blowing fan for ventilating cold air to a quick-cooling chamber; and a blowing fan for supplying cold air to a special storage compartment if other special storage compartments are provided.

The valve 183 may include a 3-way valve, an expansion valve and a check-valve that composes the cooling cycle and a water-supply valve and an ice-valve for ice-making which are provided in the refrigerator including the dispenser.

The heater 184 may include a dew-preventing heater provided in a front surface of the cabinet which contacts with the door; a freezer door heater, a refrigerator door heater, a home-bar heater and a filler heater that are provided to prevent dew-forming; an ice-maker heater for separating ice from the ice-tray; and a water-tank heater preventing water from freezing when a water tank is provided in the freezer door.

The damper is provided in an inlet or outlet of a cold-air path to open/close the path or adjust an opening level of the path. The damper may include a refrigerator damper, a freezer damper and a special-compartment damper.

Figure 3:
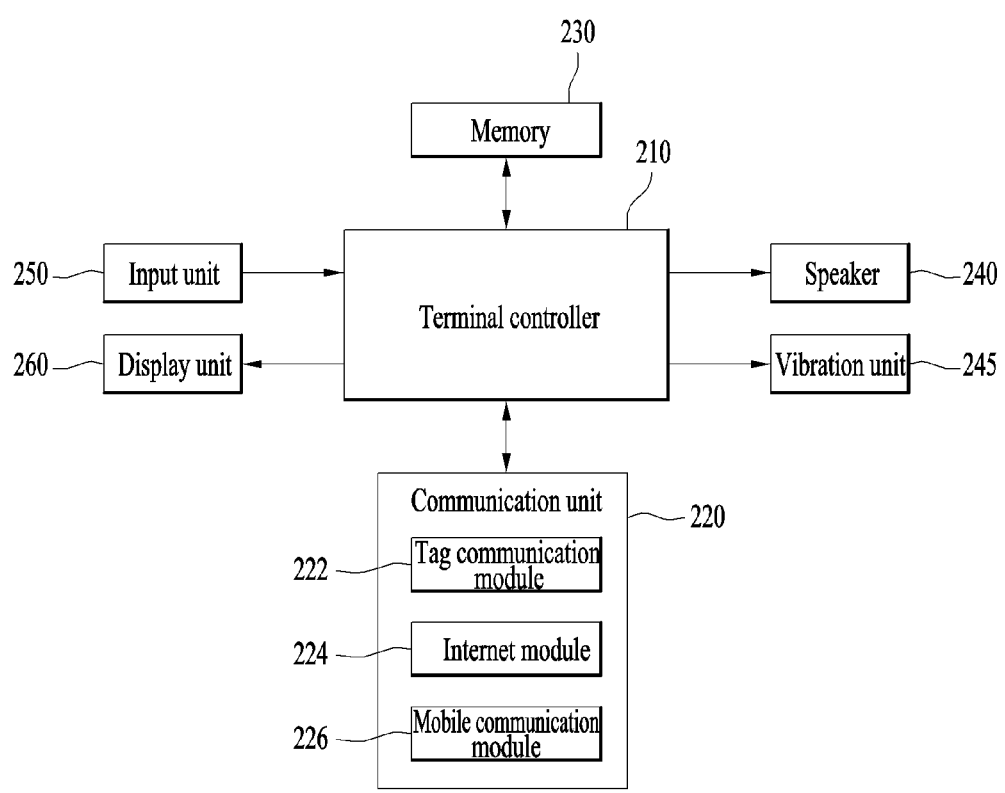
FIG. 3 is a schematic diagram illustrating a configuration of a mobile terminal.
Figure 4:
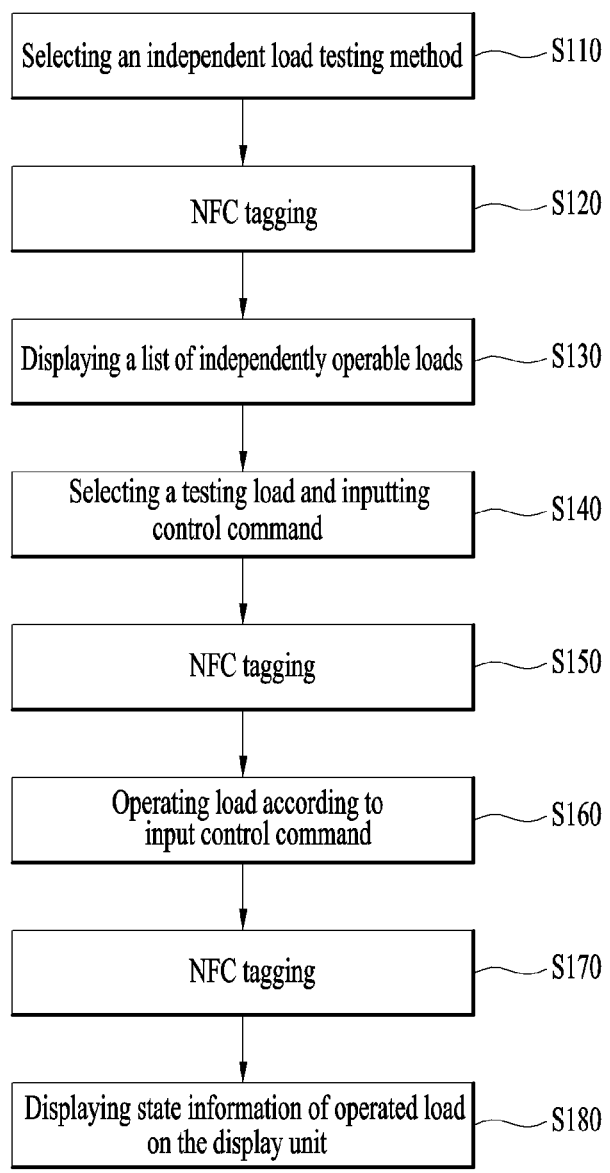
FIG. 4 is a flow chart illustrating a method for testing a normal operation of a refrigerator in accordance with one embodiment of the present disclosure.

Next, FIG. 3 is a schematic diagram illustrating the structure of the terminal.

The terminal 200 includes a communication unit 220; a memory 230; a speaker 240; a vibration unit 245; an input unit 250; a display unit 260; and a terminal control unit 210 controlling overall operation of the terminal. The terminal 200 may further include diverse sensors including a location information sensor, an acceleration sensor, a touch sensor and the like according to the type of the terminal. Detailed description of the sensors is omitted.

The input unit 250 includes one or more buttons or a touch input unit. If necessary, the input unit 250 may include both of the buttons and touch input unit. The input unit 250 applies a user's command which is input according to the user's manipulation of the input units to the terminal control unit 210.

The display unit 260 may be the preset displaying means outputting numbers, letters, special letters or images and configured of LCD and LED. If necessary, the display unit 260 may be a touch screen having a touch pad.

The display unit 260 is implemented to output the user's command input to the input unit 250 on a screen and output a preset screen corresponding to the input command. Also, the display unit 260 is implemented to display information about operation setting, operational states and information about presence of malfunction.

Especially, the display unit 260 is configured to output a list, a controlling method and a control order and information about the operation of the loads operable independently.

An application for testing a normal operation of the refrigerator is pre-installed in the terminal 200 and provided by a manufacturer. After implementing the normal operation testing application (hereinafter, App), the user performs NFC-tags the terminal to the tag unit and the application is implemented to receive data for the loads from the refrigerator. Then, the display unit 260 displays the loads in the list. At this time, the controlling method and order for the loads are also displayed on the display unit to guide the user to easily input the operation control setting for the test easily.

When NFC-tagging the terminal to the tag unit after operating a specific load of the refrigerator, the application is implemented to receive data about an operational state of the operated specific load and display the data on the display unit 260. At this time, in case the specific load is being operated, a message of the operation is displayed together with the current state of the load.

Once the operation of the load finishes, the result of the specific load operation is displayed, for example, the temperature.

In the memory 230 are stored the setting data input via the input unit 250, control data for controlling the operation of the terminal and data for the refrigerator transmitted via the communication unit 220.

A program for controlling the refrigerator is stored in the display unit 260 as App. In this instance, the program for controlling the refrigerator may be downloaded from a manufacture server or a server only for other applications.

The communication unit 220 includes a plurality of communication modules transceiving data according to a wire or wireless communication method. For example, the communication unit 220 may include a tag communication module 222, an internet module 224 and a mobile communication module 226.

The terminal 200 may communicate with a server or remote controller and other refrigerators via a network by using the internet module 224. The terminal 200 may be linked to the mobile communication module 226 by mobile communication network only to transceive data and use services such as voice message. The tag communication module 222 as one of the NFC communication modules transceives mutual data when tagged to the tag unit 140 of the refrigerator.

The terminal controls unit 210 stores the data transceived with the communication unit 220 in the memory 230 and controls input/output of data. The terminal control unit 210 controls the operation of the terminal according to the data input via the communication unit 220 and the input unit 240 and the control setting to be changed via the application.

In addition, the terminal control unit 210 displays a menu screen for inputting a control command and transmits the setting data input to the input unit 250 to the refrigerator via the communication unit 220 so as to operate each of the loads according to the setting. The terminal control unit 210 analyzes the data received from the refrigerator and outputs the result of the analysis to the display unit 260 as monitoring data.

The speaker 240 of the terminal 100 is the output device configured to output sound such as buzzer and output a setting notice of the application for testing the normal operation displayed on the display unit 260 in the form of voice. Sound such as buzzer informs the user that data is being transceived, while data is transceived by NFC after the user's NFC tagging.

The data transceiving may be informed by vibrating the vibration unit 245 not by the speaker 240 or by operating both the speaker 240 and the vibration unit 245. Of course, the user can set whether to operate the speaker 240 or the vibration unit 245.

The method for testing the normal operation of the refrigerator may include a method for testing each independent load and a method for testing a cycle. The independent load testing method operates one or more controllable loads to test whether the load is normally operated. The cycle testing method operates a plurality of loads related with each other to implement a specific function, in a specific order, to test whether the specific function is normally implemented.

Referring to FIGS. 4 through 12, a method for testing a normal operation of each independent load in accordance with one embodiment of the present disclosure will be described in detail.

First of all, the user implements the application downloaded in the terminal 200 to test a normal operation of the refrigerator and selects an independent load testing method (S110).

Figure 5:
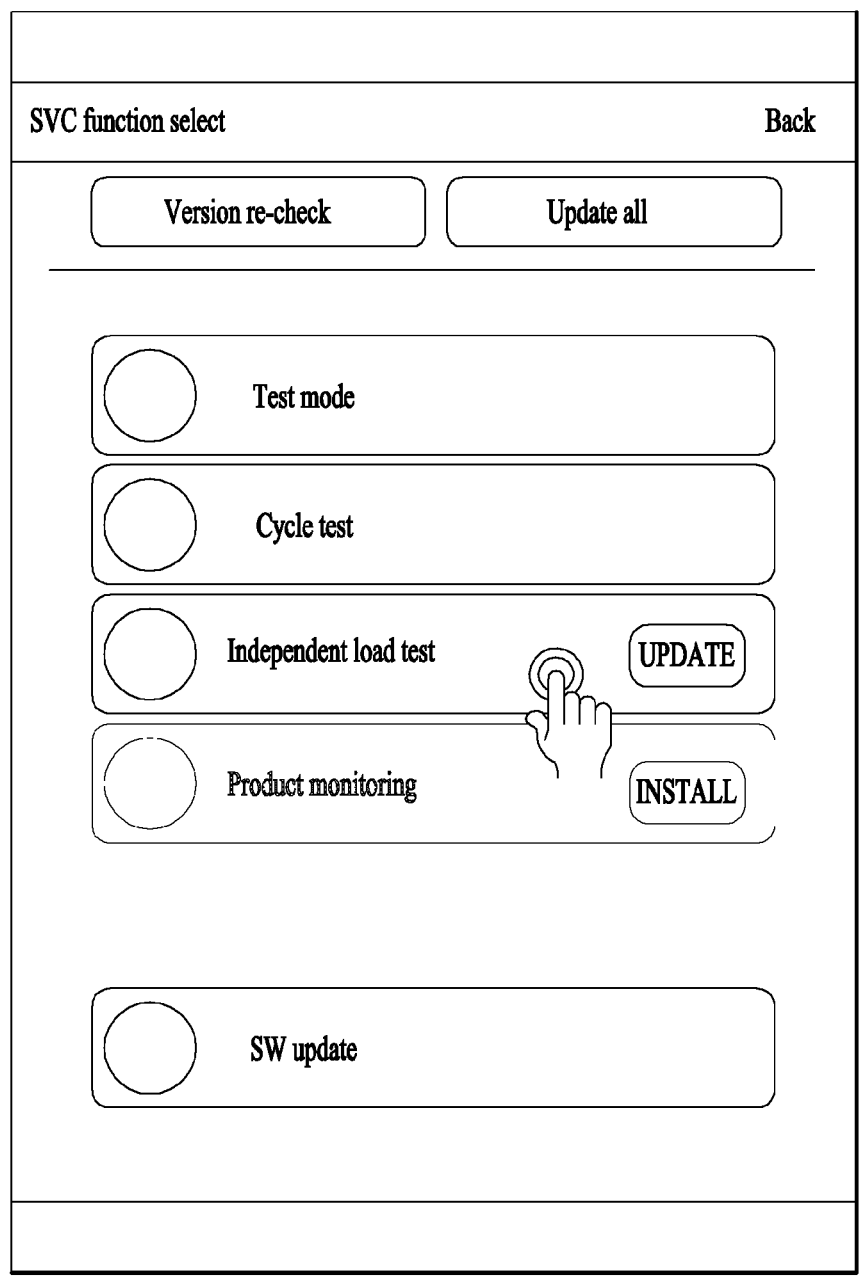
FIGS. 5 through 12 are diagrams illustrating a screen of a display unit provided in the mobile terminal when testing the normal operation of the refrigerator shown in FIG. 4.
Figure 6:
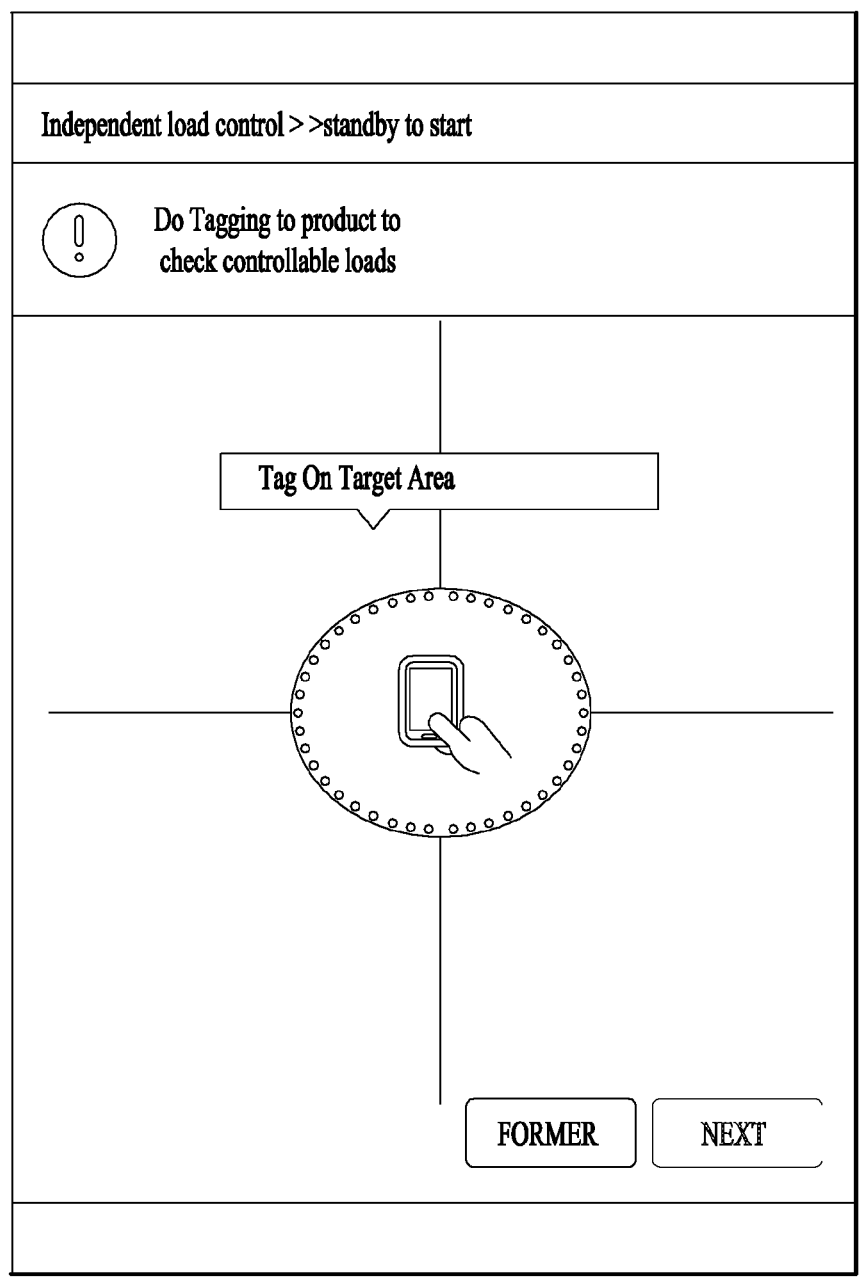

FIG. 5 shows a screen of the display unit 260 when the application is implemented in the terminal 200. The applications typically have versions and a current version of the application is displayed to allow the user to update a new version. If updating is required, a pop-up window guiding the updating may be displayed.

As shown in FIG. 5, LG electronics service application is displayed in an upper area of the display screen, together with a logo of LG electronics which is an applicant of the present disclosure and service (SVC) function selection is displayed below the application. Version re-check and overall updating buttons may be displayed there below. A test mode, cycle testing, independent testing buttons are displayed and a deactivated product monitoring button is displayed there below. A software (SW) update button there below and the current version is displayed in the lowermost left area and the user of the terminal is displayed in the lowermost right area. The users of the terminal are usually trained service technicians who visit the places having the malfunctioning refrigerator on the service request and implement the application to test the normal operation of the refrigerator.

In the illustrated example of FIG. 5, the user may touch and implement the independent load testing on the application screen. After that, a screen for guiding the NFC tagging is displayed on the display unit 260 shown in FIG. 6.

The user tags the terminal 200 displaying the NFC guide screen to the tag unit 140 (S120). At this time, the list data of the independent operable loads provided in the refrigerator which is stored in the memory 130 may be transmitted to the terminal via the tag communication module 222.

Hence, the terminal control unit 210 receives the list data of the loads input from the communication unit 220 and displays the list of the loads on the display unit 260 according to the setting of the application (S130). The display unit 260 of the terminal displays a screen for guiding a method for setting each load that is an operation object so that the user can input the settings easily.

Figure 7:
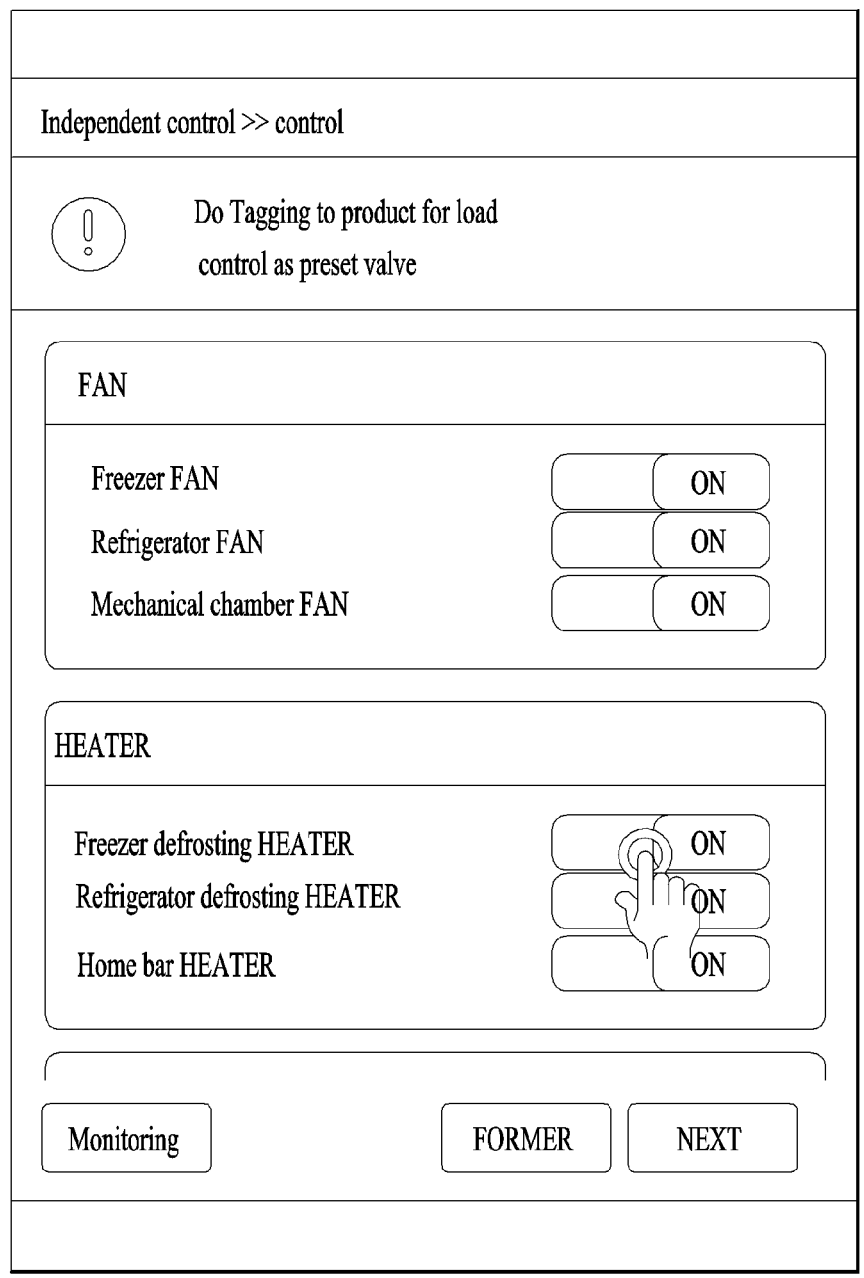

FIG. 7 illustrates a screen displaying an independent operable load and a method for operating the same. On the screen shown in FIG. 7 may be displayed as examples of the loads a freezer fan for supplying cold air to the freezer compartment, a refrigerator fan for supplying cold air to the refrigerator compartment, a mechanical chamber fan for radiating the condenser and the compressor installed in the mechanical chamber, a freezer defrosting heater for defrosting the evaporator for the freezer compartment, a refrigerator defrosting heater for defrosting the evaporator for the refrigerator compartment, a home-bar heater for preventing dew from forming on a contact portion between the home-bar door and the main door. In case there are many loads as setting objects as shown in FIG. 7, the user touches and drags the display screen and the loads are displayed in line.

After that, the user selects one load which will be tested and inputs a control command for the load (S140). Control commands for corresponding loads may be different from each other. For example, RPM and the operation time may be input for the compressor and simply the operation time is set for the heater or the start or end of the operation time is set. The range of heating temperatures may be set together.

The setting method of the fan and heater shown in FIG. 7 is displayed only using ON/OFF. As the operation time for testing each of the loads is preset in the application. When the user only determines whether to operate each of the loads and sets the control setting. The application is implemented to transmit command data for the operation time for each load.

Meanwhile, a specific load might not be operated appropriately or have an error, if operated under a specific condition, together with other loads. It is preferred that a pop-up window is displayed on the display unit for warning the user of the abnormal operation or error.

Figure 8A:
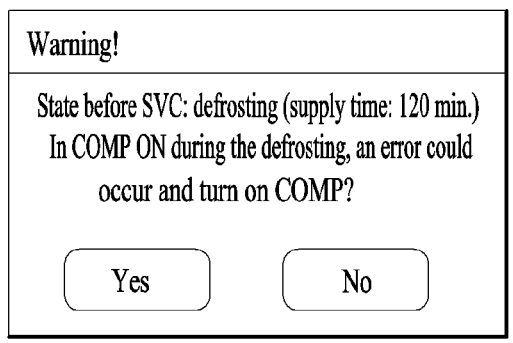

As shown in FIG. 8A, when operating the compressor after setting the defrosting heater to be switched on, an evaporator refrigerant pipe is cooled by the refrigerant circulated by the compressor and the defrosting heater heats the evaporator. Accordingly, useless energy consumption and errors are likely to occur and that is why the warning window is popped up when inputting a command for switching on the compressor during the defrosting.

Figure 8B:
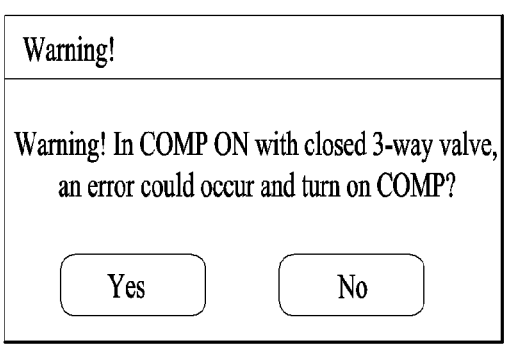

A 3-way valve shown in FIG. 8B is connectedly provided between two expansion devices connected with the condenser. When the compressor is operated in a state where the 3-way valve is closed, the refrigerant cannot circulate only to generate an error of the compressor, which has to be warned.

Figure 8C:
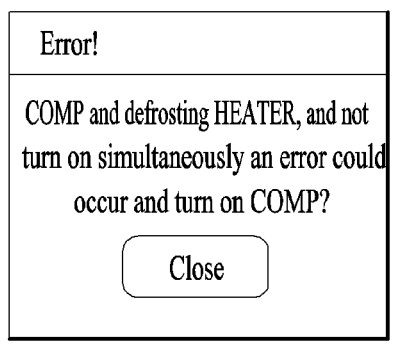

As shown in FIG. 8C, it is warned that the compressor and the defrosting heater are not operated simultaneously when the defrosting heater is switched on in a state where the compressor is being operated.

Figure 8D:
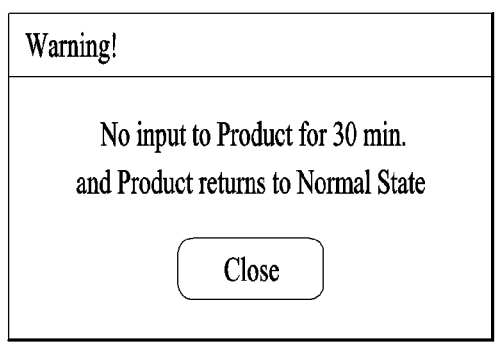

As shown in FIG. 8D, the user inputs the independent load control setting and operates the refrigerator for a preset time period after NFC-tagging the terminal. When no input is sensed in the terminal in 30 minutes after the final command tagging, without the independent load control finish tagging, it is noticed to the user that the product returns to the normal state, in other words, the state before operating the independent load testing. In this instance, the returning of the refrigerator to the normal state in a preset time period, for example, 30 minutes, without NFC tagging, may mean that the control command for returning to the normal state when no tagging or input is performed even in 30 minutes is input to the application as its preset command when tagging is performed after the independent load control setting is input.

After inputting the independent load control setting, the user performs NFC-tagging and transmits the control command data for each load to the refrigerator (S150).

The controller 110 of the refrigerator operates each of the loads according to the control command received via the tag unit 140 (S160). Each load may be separately and independently controlled, so that the loads can be operated simultaneously.

Figure 11:
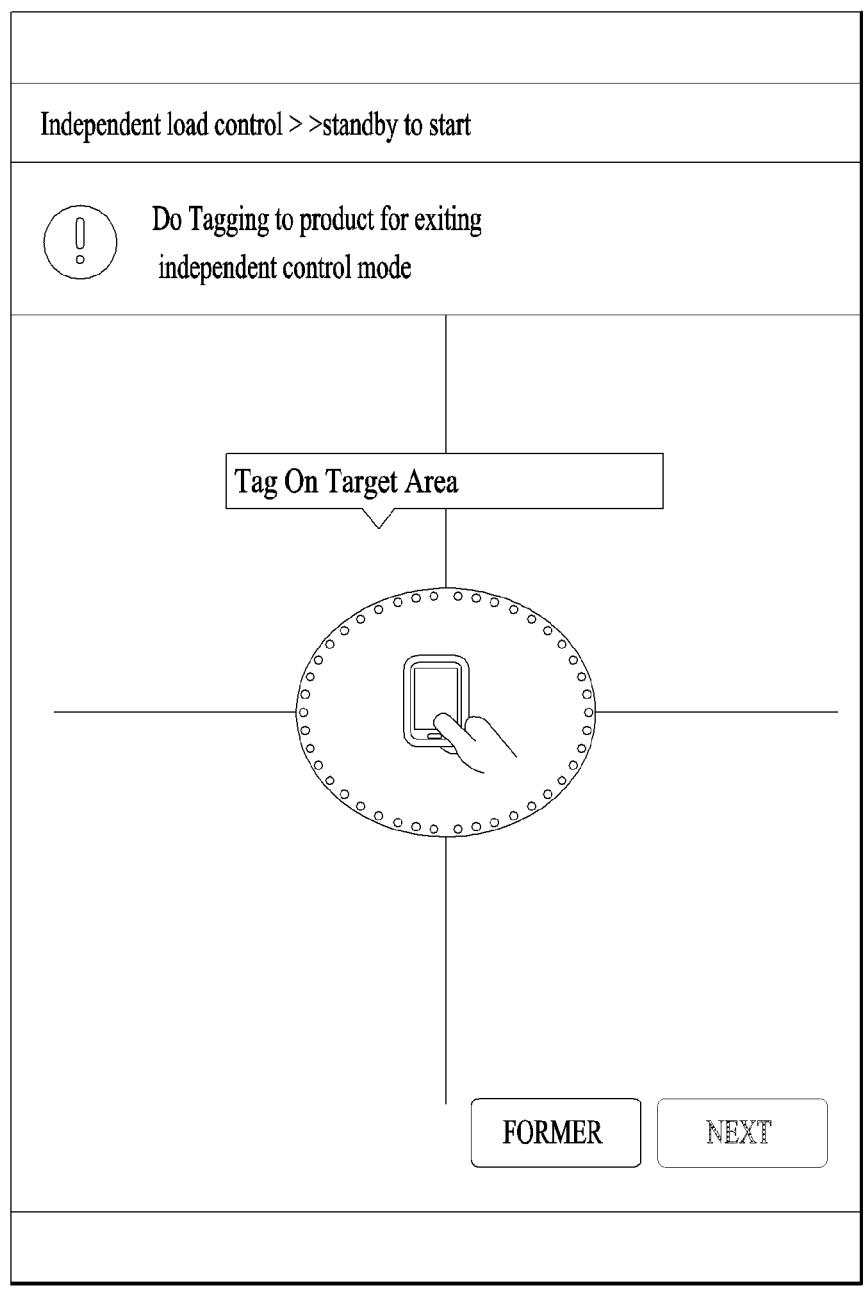

Once a preset time period for completing the operation of each load according to the input control command passes, the display screen of the terminal guides NFC tagging to finish the independent load control mode as shown in FIG. 11.

Figure 10:
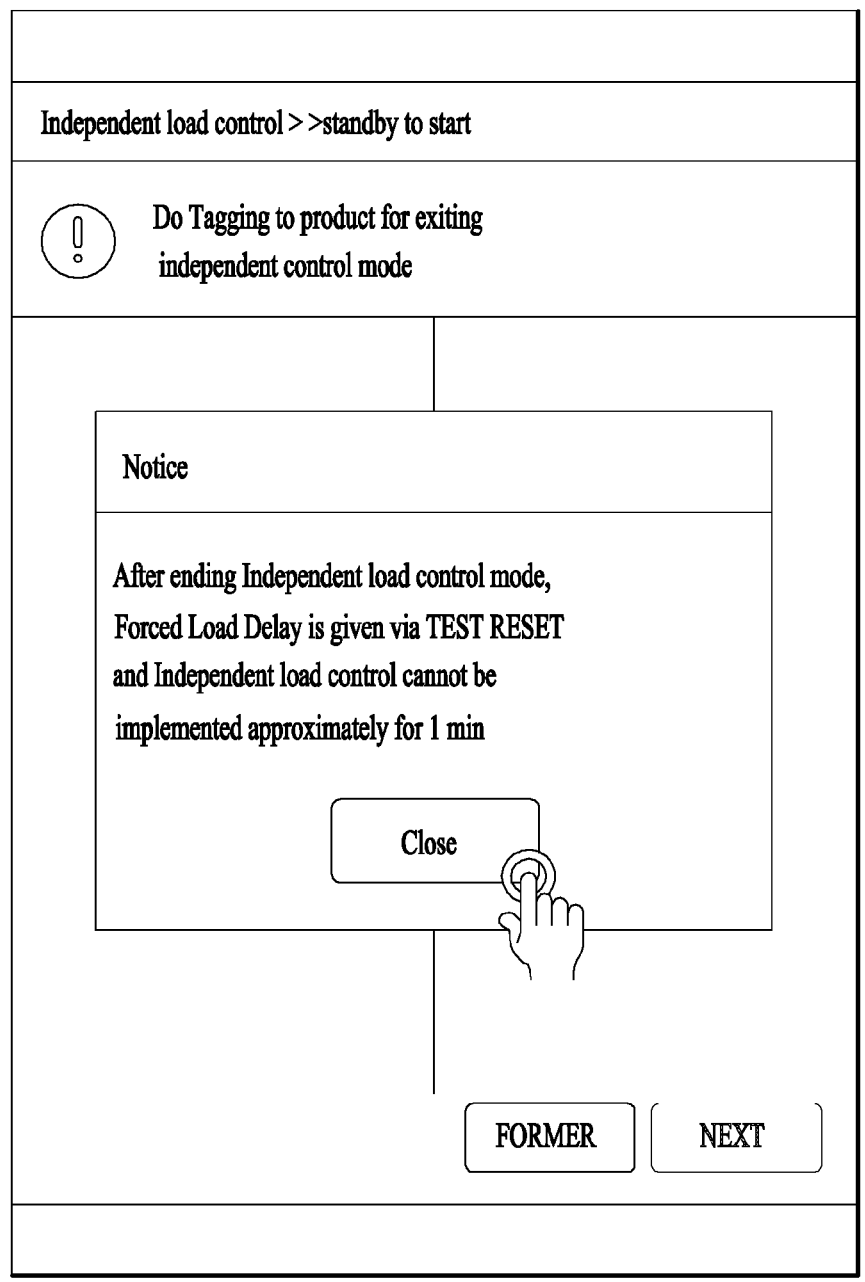

As shown in FIG. 10, forced load delay is provided to reset a test after ending the independent load control mode and it is guided on the display unit of the terminal that the independent load control cannot be implemented approximately for 1 minute. It is preferred that NFC tagging is guided as shown in FIG. 11 after the guide. The independent load control may be implemented several times for the same load but it has to be implemented for a new test once the load returns to the initial state before the operation completely, so as to test the normal operation precisely.

Figure 9:
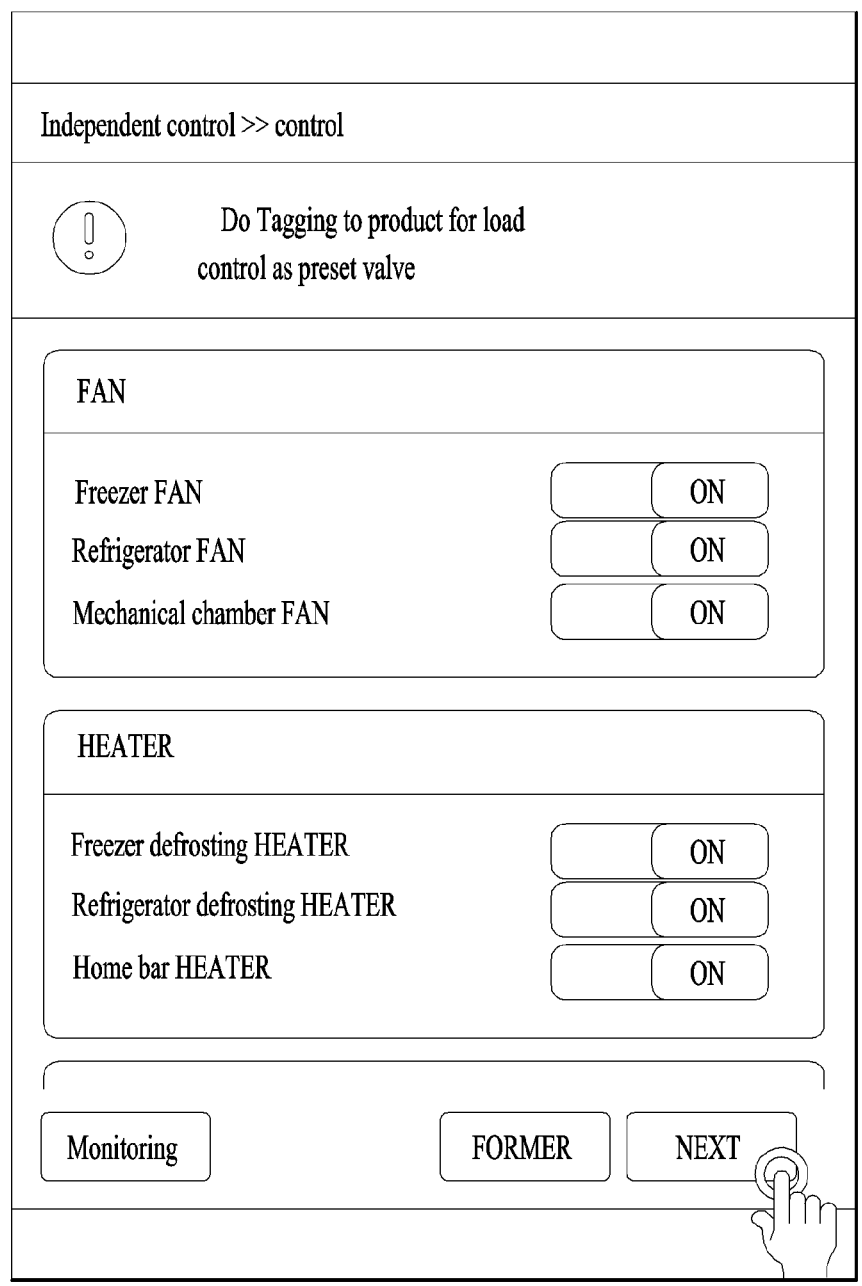

Meanwhile, the user may receive state data for each load by NFC tagging anytime, even while the testing of each load for the independent load control is being operated. As shown in FIG. 9, the user performs NFC tagging after setting to monitor the state data of each load even during the independent load control and receives the state data for each load to output the received data to the display screen of the terminal.

when NFC tagging is generated in a sufficient time period enough to complete the independent load control, the terminal 200 receives the state information data of each load and displays the received data on the display unit 260 (S180).

Figure 12:
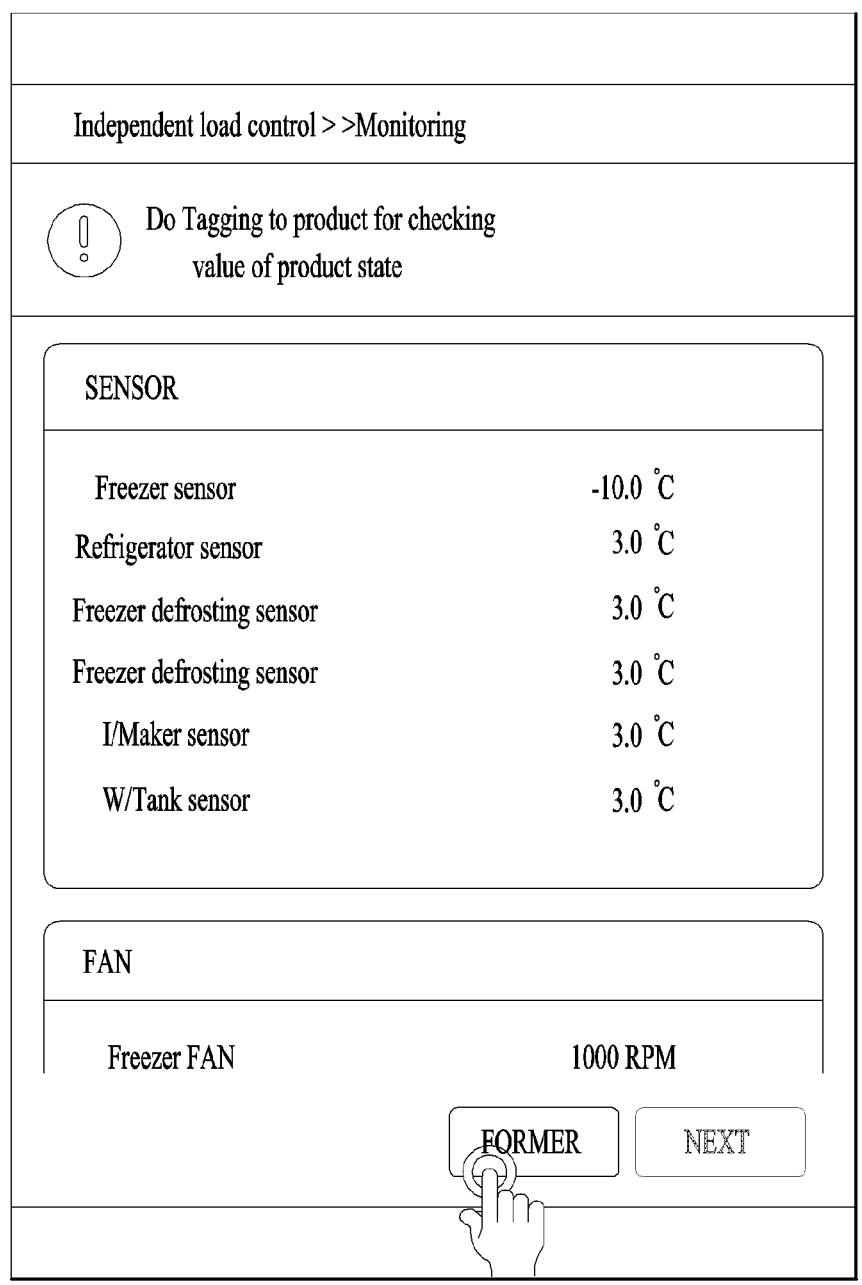
Figure 13:
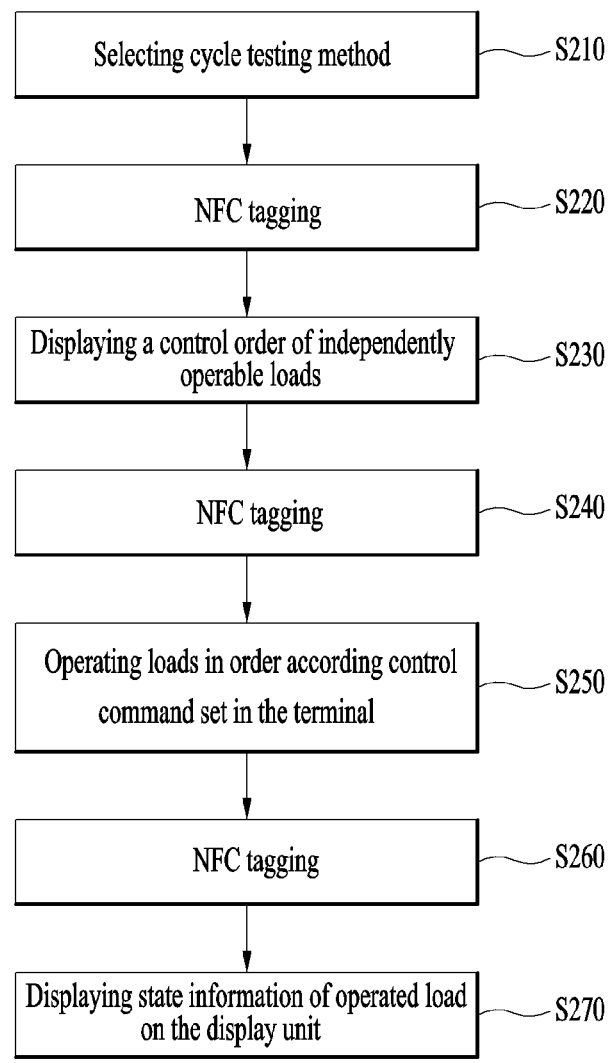
FIG. 13 is a flow chart illustrating a method for testing a normal operation of a refrigerator in accordance with another embodiment.

As shown in FIG. 12, each load operated for a preset time period according to a setting command may display the data sensed by the diverse sensors of the refrigerator on the display unit 260 as state data according to the operation of each load. For example, the state after operating the freezer fan may be displayed as RPM of the freezer fan. In case the freezer fan is operated together with the compressor, the freezer sensor may display the temperature in the freezer compartment together with the state data. FIG. 12 shows the freezer temperature, the refrigerator temperature, the freezer defrosting temperature, the refrigerator defrosting temperature, the ice-maker (I/Maker) temperature and the water tank (W/Tank) temperature as the temperature values measured by the sensors.

The state of the operated load as the state data of the heater 184 is displayed as not the electricity applied to the heater but the temperature of the portion heated by the heater that is measured by the sensor to make it easy to test the normal operation of the heater.

Next, referring to FIGS. 13 through 21, a cycle testing method of the refrigerator in accordance with another embodiment will be described.

First of all, the user implements an application downloaded in the terminal 200 to test a normal operation of the refrigerator and selects a cycle testing method (S210).

Figure 14:
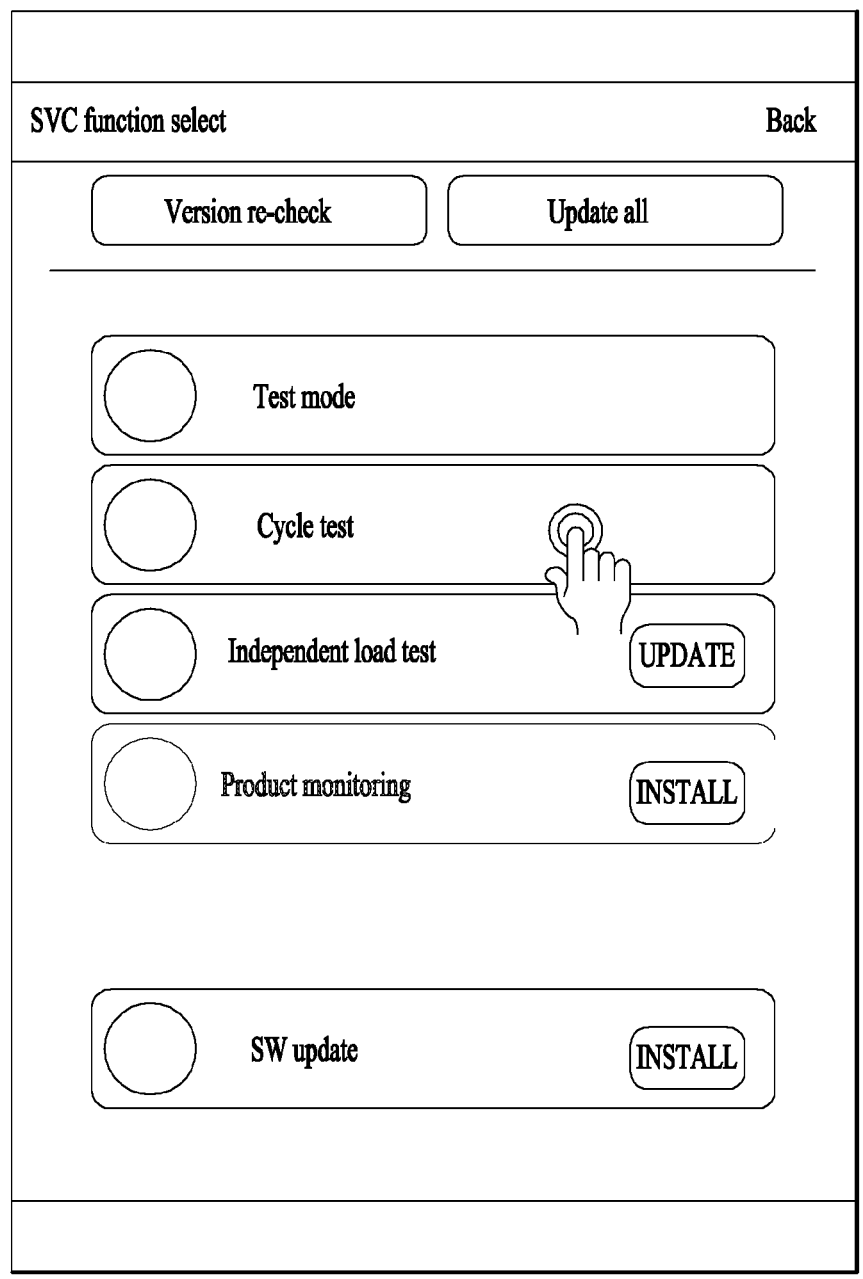
FIGS. 14 through 21 are a screen of a display unit provided in the refrigerator when testing the normal operation of the refrigerator.

FIG. 14 shows a screen of the display unit 260, when the application is implemented on the terminal 200. The user touches a cycle testing method as the testing method.

Figure 15:
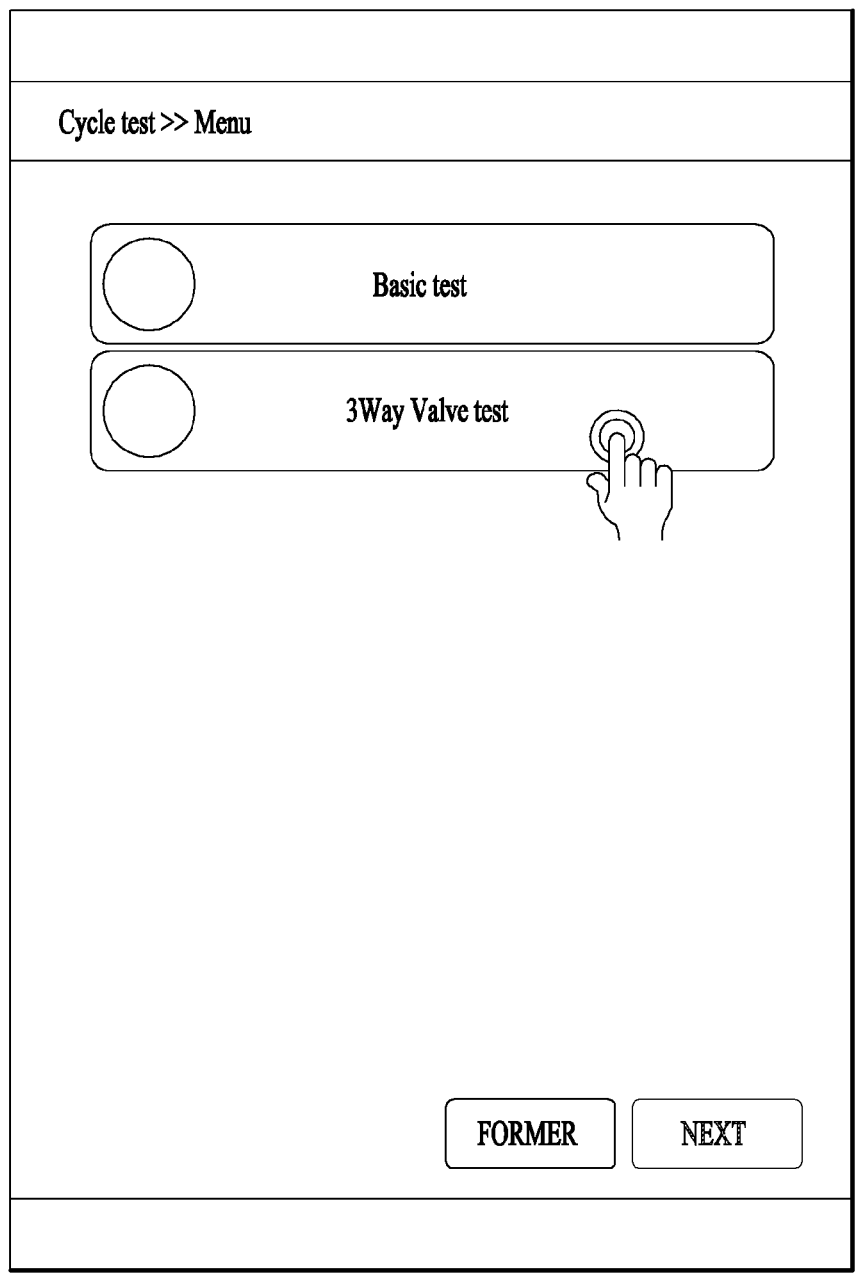

FIG. 15 shows a basic test and a 3-way valve as screens realizing a menu of the cycle testing. The basic test operates a series of loads except the loads provided in the cooling cycle in a preset order. The 3-way valve test operates the loads provided in the cooling cycle in a preset order.

FIG. 15 shows that the user implements the 3-way valve test by touching.

Figure 16:
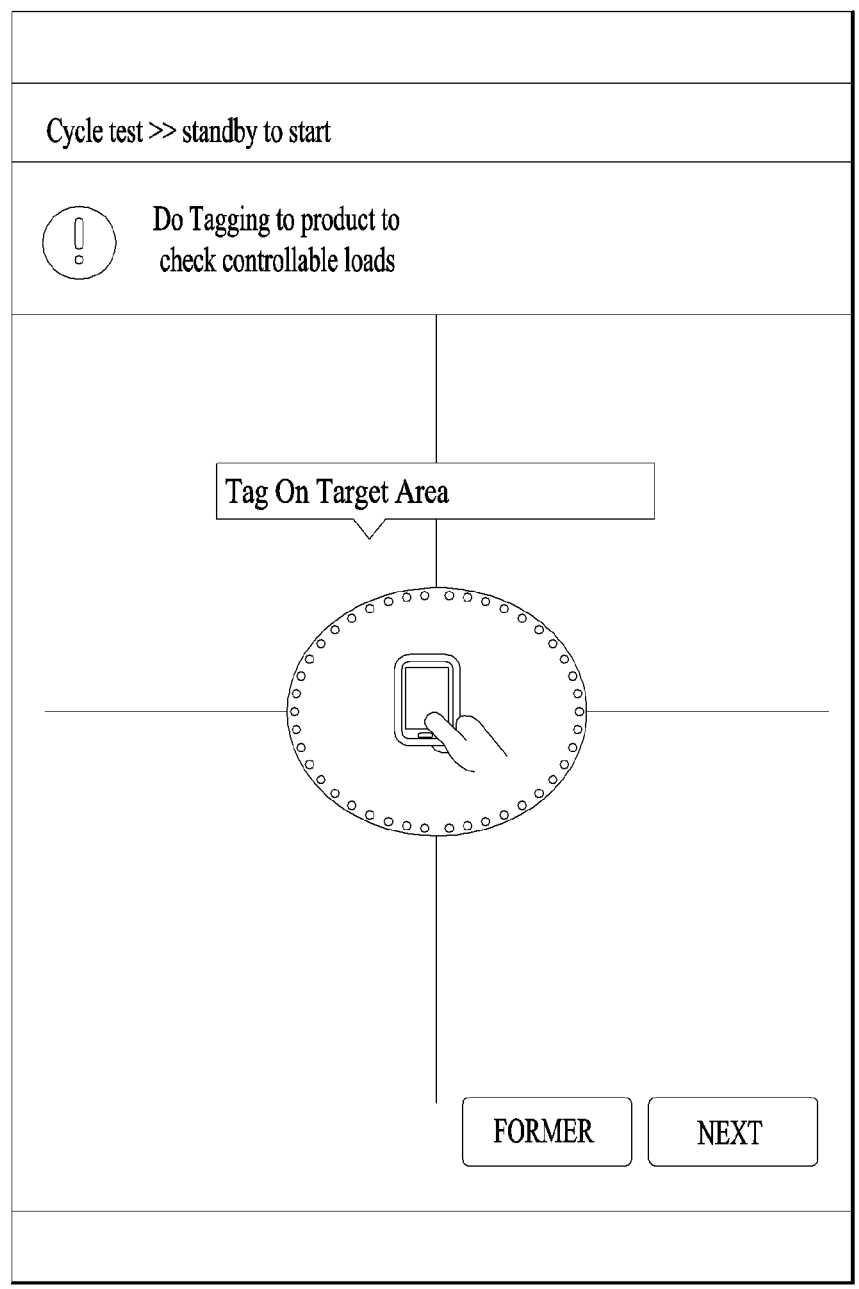

When the user selects the cycle test menu, an image guiding NFC tagging is displayed on a screen of the display unit 260 as shown in FIG. 16.

The user NFC-tags the terminal to the tag unit 140 of the refrigerator according to the guide of the terminal 200 (S220).

Hence, the control order of the independently operable loads id displayed on the terminal 200 (S230).

FIGS. 17 through 20 illustrate examples of the 3-way valve. The cooling cycle includes a compressor, a condenser, a 3-way valve, an expansion device and an evaporator for the freezer compartment that are connected in parallel, and an expansion device and an evaporator for the refrigerator compartment. A blow fan may be installed in each of the evaporators and a heat-sink fan may be installed in the condenser in the cooling cycle. Also, other components such as a vapor-liquid separator and a defrosting heater may be installed in the cooling cycle.

The illustrated control order of the loads may include an opening step for opening the 3-way valve toward the freezer compartment at the same time with operating the compressor; a refrigerant supplying step for supplying refrigerant to the expansion device and the evaporator for the freezer compartment; an opening step for opening the 3-way valve toward the refrigerator compartment at the same time with operating the compressor; and a refrigerant supplying step for supplying refrigerant to the expansion device and the evaporator for the refrigerator compartment. It shall be understood that the exemplified cycle testing control order means one control interval of the cooling cycle.

Specific control methods of each step are preset in the application and the user needs not set specific orders. If necessary, the user is able to change and input a specific setting as desired.

The user NFC-tags the terminal to the tag unit 140 of the refrigerator again, after inputting the control setting of the load control to the application (S240).

Hence, the controller 110 of the refrigerator controls the loads to be operated in the set order according to the control command received by the tag unit 140 (S250).

The control command for the loads may be transceived by one NFC-tagging or several steps or a corresponding number of NFC-taggings to the steps according to the user's selection separately. In the corresponding number of the NFC-taggings, the user may change the setting for a specific step during the control of the cycle test and calculate the duration time of each step, so that the waiting time between the steps can be reduced only to reduce the overall testing duration time. The latter case is more preferred.

Figure 17:
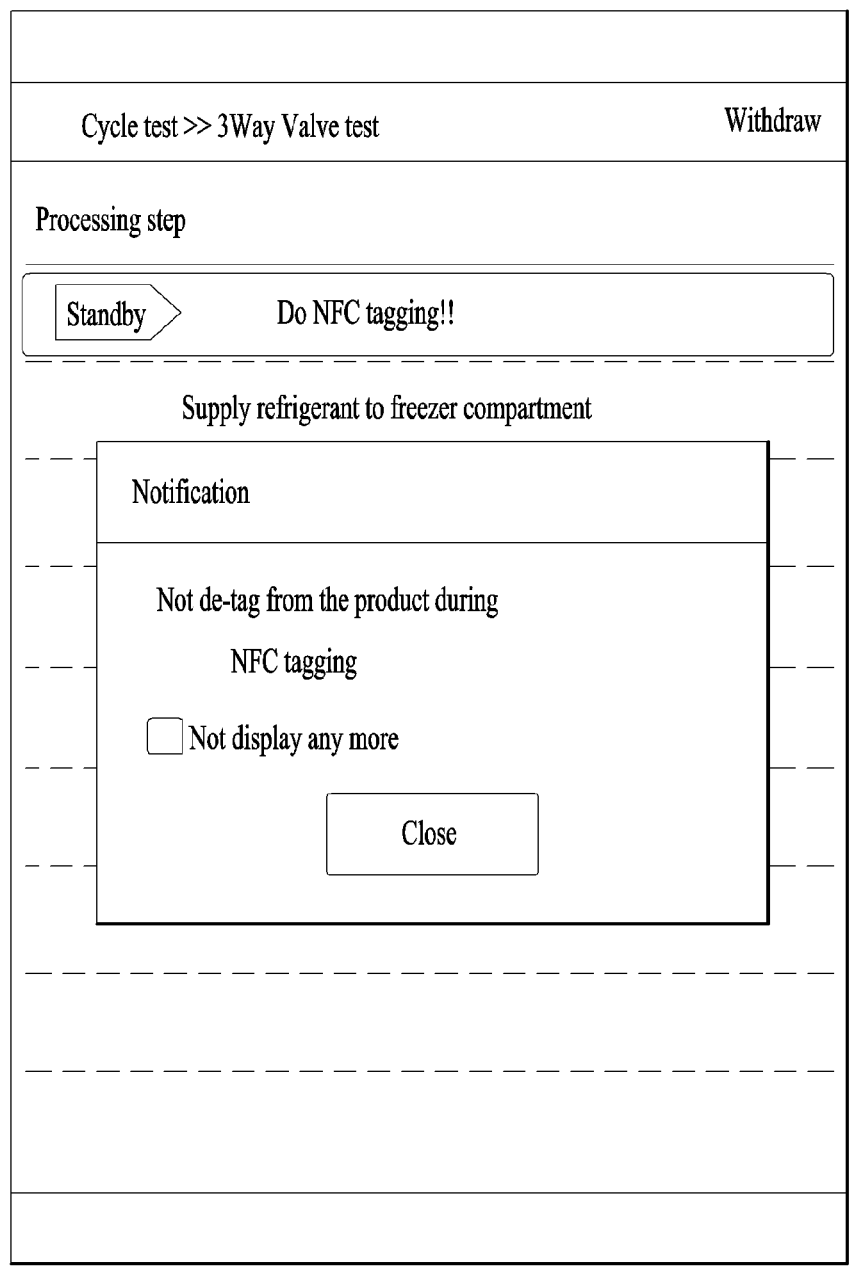

As shown in FIG. 17, it may be noticed to the user by the vibration of the vibration unit 245 during the NFC tagging that the data is being transceived. A guide for informing the user not to de-tag or detach the terminal from the refrigerator until the vibration ends.

It may be noticed to the user by the sound output from the speaker 240 such as buzzer as well as the vibration of the terminal simultaneously that the data is being transceived. In this instance, the sound output during the data transceiving is differentiated from the sound output in the completion of the data transceiving, to distinguish the sounds from each other clearly.

Figure 18:
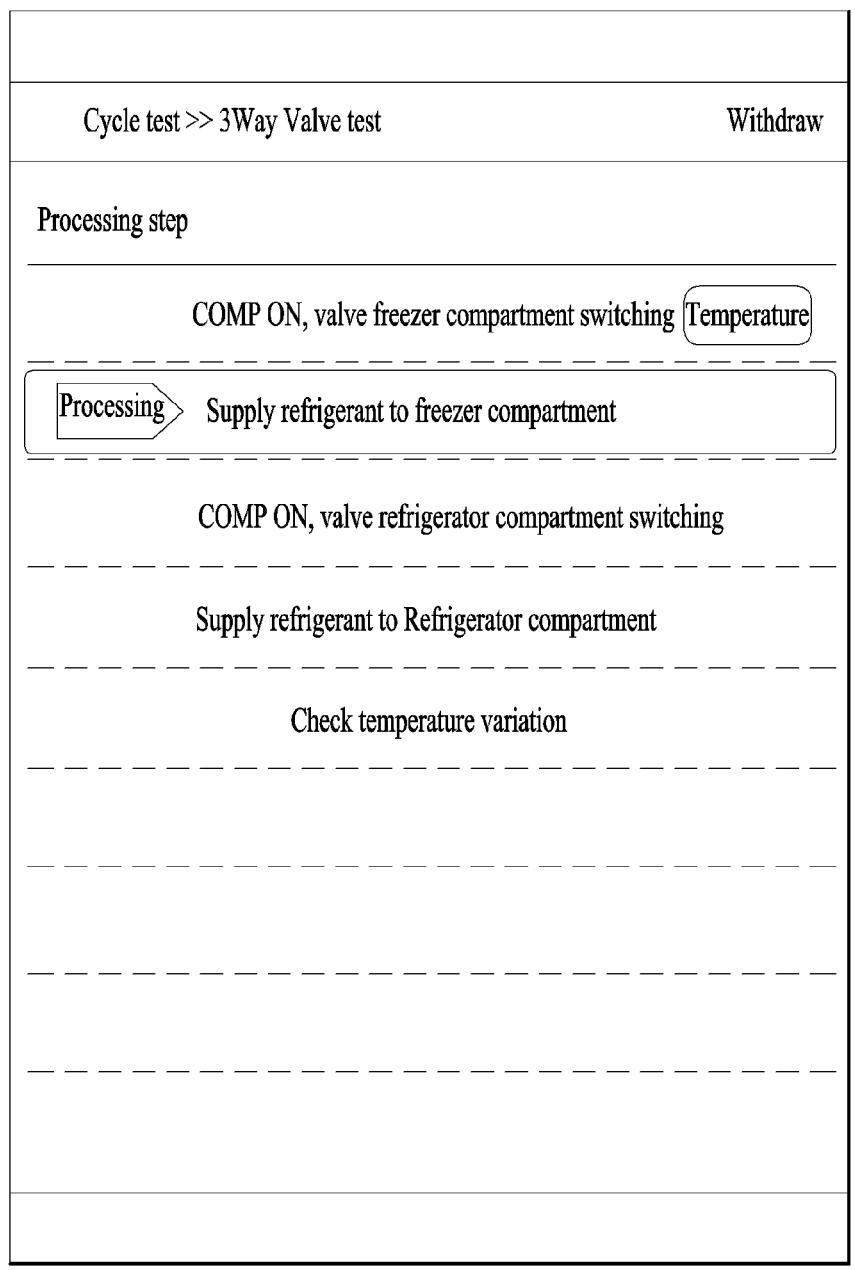

As shown in FIG. 17, an image for guiding NFC tagging and a standby image may be displayed in each step of the cycle test to process the step. As shown in FIG. 18, it is displayed on the screen of the terminal that the steps are being implemented. As one illustrated example, FIG. 18 shows that the refrigerant supply step for the freezer compartment is being implemented.

Figure 19:
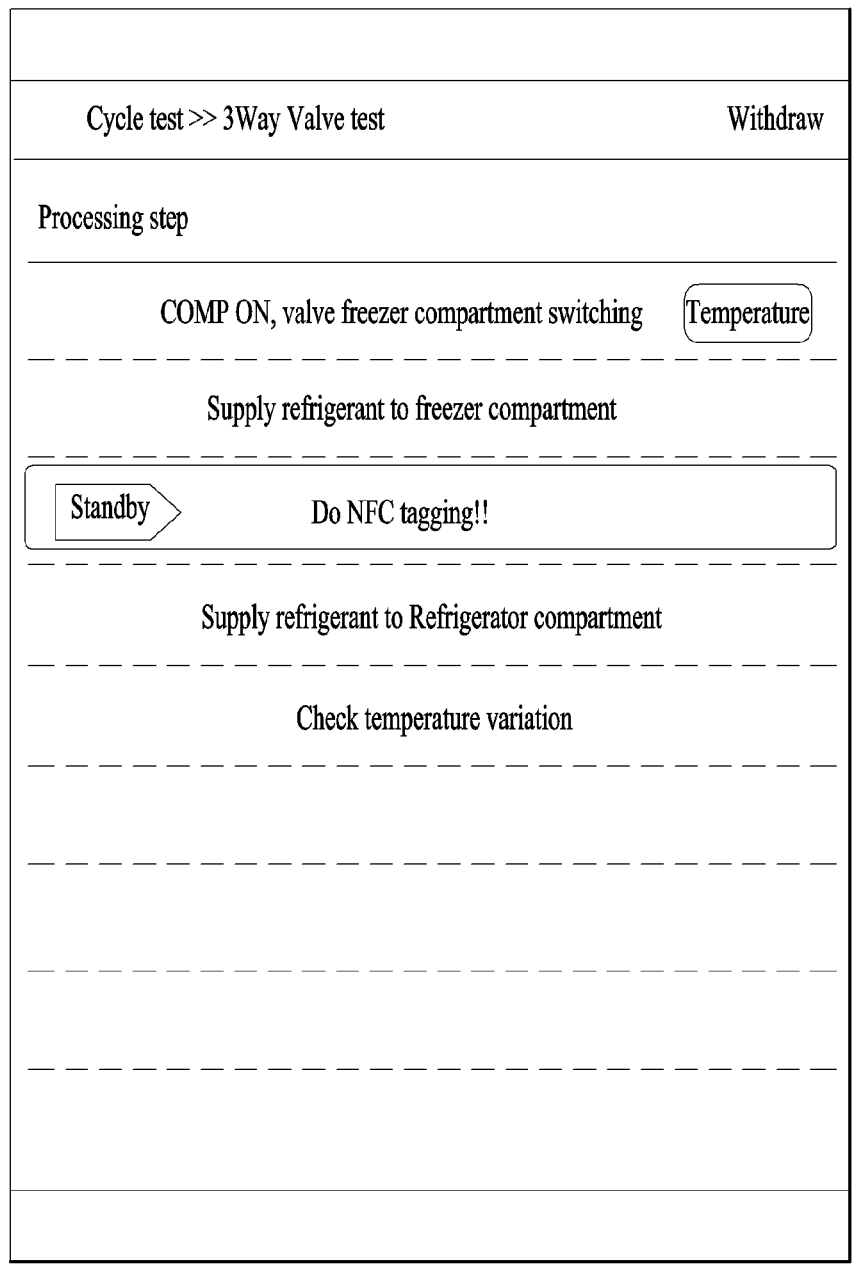
Figure 20:
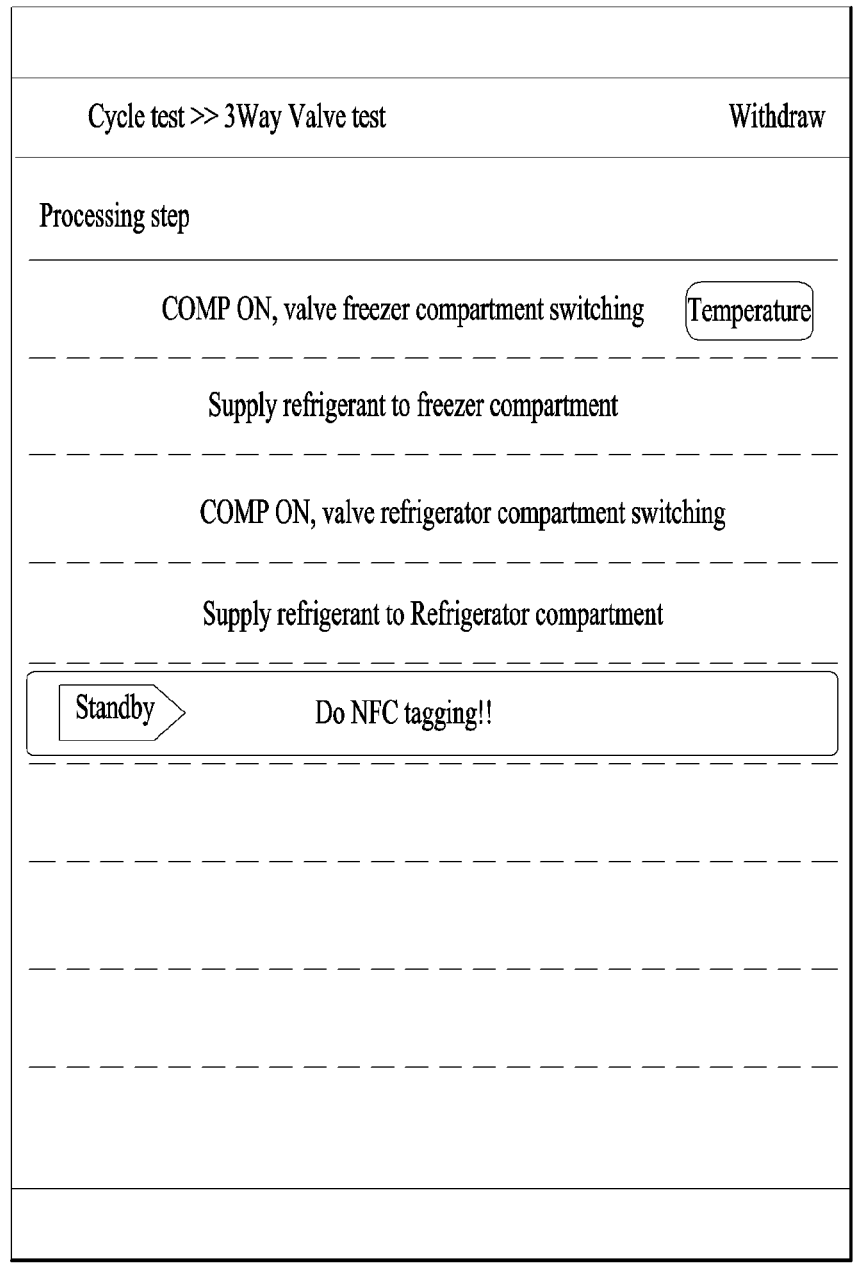

As shown in FIG. 19, the refrigerant supplying step for the freezer compartment finishes and the compressor-on step and the 3-way valve opening step toward the refrigerator compartment are in standby, so as to guide NFC tagging.

Finally, once the load operation in all of the steps is complete, NFC tagging is guided to check temperature variation and the user performs NFC tagging according to the guide (S260).

Hence, the state information of the operated load is transmitted and displayed on the display unit (S270).

Figure 21:
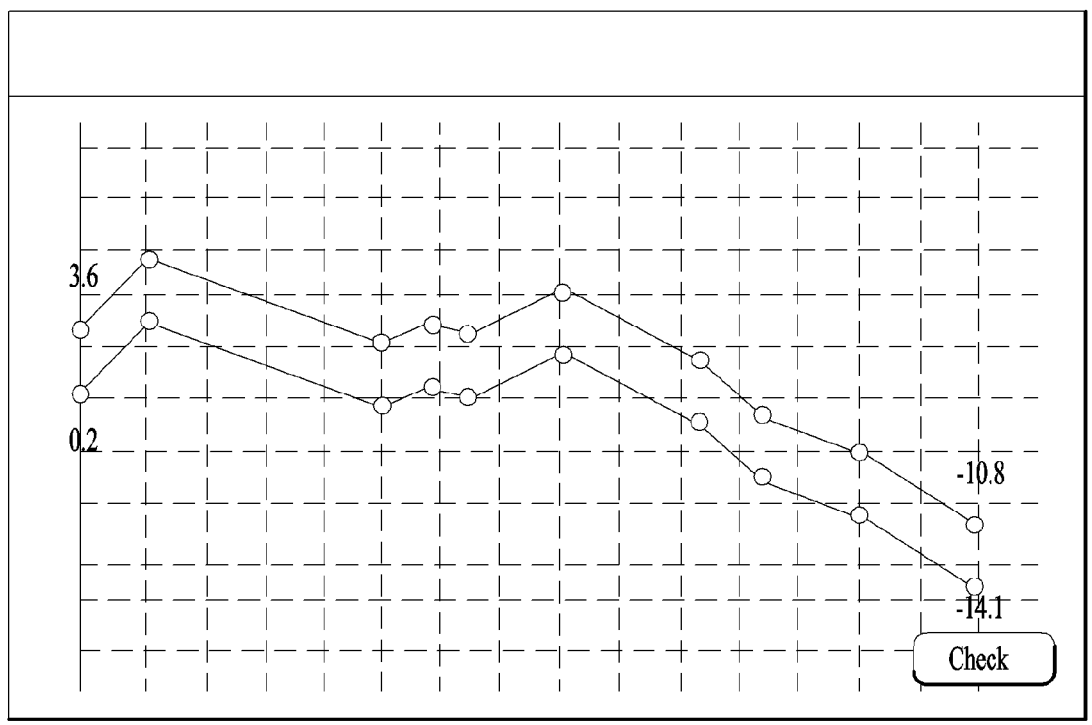

As shown in FIG. 21, the state data of the refrigerator is based on the result of the result of the cycle test from the operation of the cooling cycle. It is preferred that the state data is illustrated as a time-based graph of temperature variation in the freezer and refrigerator compartments. In other words, while the application implements the load control for the cycle test, the controller 110 of the refrigerator measures the temperatures of the freezer and refrigerator compartments at preset intervals as data and stored the data in the memory 130. After the cycle test, the user NFC-tags the terminal to the tag unit and terminal application receives the stored temperature data and covers it into monitoring data which is easy for the user to understand, only to display the data as a temperature variation graph.

The user sees the temperature variation graph shown in FIG. 21 and easily determines whether the loads of the cooling cycle are normally operated.

Various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A system comprising:
   a refrigerator comprising:
      a tag unit performing near-field communication (NFC);
      a refrigerator processor that controls an operation according to an input setting; and
   a terminal comprising:
      a terminal communication unit that transceives data with the tag unit by NFC;
      a terminal display that outputs a list, a controlling method, and a control order of independently operable loads and operational information of each of the independently operable loads; and
      a terminal processor that transmits the setting data input via the terminal communication unit to the refrigerator and analyzes the data received from the refrigerator,
      wherein the result of the analyzed data is output on the terminal display.

2. The system of claim 1, wherein the tag unit comprises:
   a tag storage that stores data; and
   a transceiver that transceives data with the terminal communication unit using NFC.

3. The system of claim 1, wherein the refrigerator further comprises,
   an input unit that receives a control command input by a user;
   a refrigerator display that displays an operational state of the refrigerator and the control command;
   a sensing unit having diverse sensors; and
   a memory that stores the operation state and data related with the control method of the refrigerator.

4. The system of claim 1, wherein when the terminal communication unit is tagged to the tag unit after an independent load test is selected at the terminal, a list of the independently operable loads is displayed on the terminal display.

5. The system of claim 4, wherein when the terminal communication unit is tagged to the tag unit after a desired load is selected at the terminal and a corresponding control command is input, the refrigerator processor operates the load according to the input control command.

6. The system of claim 5, wherein when the terminal communication unit is tagged to the tag unit after operation of the selected load, the state information of the operated load is displayed on the terminal display.

7. The system of claim 1, wherein when terminal communication unit is tagged to the tag unit after a cycle test is selected at the terminal, the terminal displays a list, a control method, and a control order of controllable loads on the terminal display.

8. The system of claim 7, wherein the refrigerator processor operates a compressor and supplies cold air to a freezer compartment of the refrigerator by opening a 3-way valve toward the freezer compartment and then supplies cold air to a refrigerator compartment of the refrigerator by opening the 3-way valve toward the refrigerator compartment, and stores the sensed temperatures of the freezer and refrigerator compartments in a memory of the refrigerator.

9. The system of claim 8, wherein when the terminal communication unit is tagged to the tag unit after implementing the cycle test and selecting to check temperature variation on the terminal, the temperature variation of the freezer and refrigerator compartments is displayed on the terminal display.

10. The system of claim 1, wherein while transceiving data by the tagging of the terminal communication unit to the tag unit, the terminal vibrates or emits audio.

11. A method for testing an operation of a refrigerator, the method comprising:
    displaying, on a display of a terminal, a list of controllable loads;
    selecting a desired load from the list of controllable loads and inputting a setting command for the desired load via the terminal, the desired load and input setting command being communicated to a tag unit of the refrigerator via near-field communication (NFC);
    operating the desired load, via a refrigerator processor, according to the setting command received from the terminal via the tag unit; and
    implementing, via a terminal processor in communication with the tag unit, the terminal to display state information of the operated load on the display.

12. The method of claim 11, wherein the terminal transceives data, via a terminal communication unit, with the tag unit of the refrigerator by NFC.

13. The method of claim 12, wherein the terminal is NFC-tagged with the refrigerator to acquire a list of controllable loads provided in the refrigerator, operate the loads according to input setting, and acquire state information of the loads.

14. The method of claim 12, wherein the terminal communication unit is tagged to the tag unit after an independent load test is selected at the terminal, the terminal displays a list of the independently operable loads on the display.

15. The method of claim 14, further comprising:
    providing, via the terminal processor, an interface at the terminal display for allowing a user to set an operation and a control method for each load.

16. The method of claim 15, wherein the terminal processor processes data related with state information of the operated load into monitoring data and displays the processed monitoring data on the terminal display.

17. The method of claim 11, wherein when an error occurs after the setting command for a specific load is input and the specific load is operated with another specific load, the terminal processor controls the terminal display to display a warning message.

18. The method of claim 12, wherein when the terminal communication unit is tagged to the tag unit after selecting a cycle test at the terminal, the terminal displays a list, a control method, and a control order of controllable loads on the terminal display.

19. The method of claim 18, wherein the refrigerator processor operates a compressor by controlling a 3-way valve to open toward the freezer compartment to supply cold air to a freezer compartment, controlling the 3-way valve to open toward the refrigerator compartment to supply cold air to a refrigerator compartment, and storing the sensed temperatures of the freezer and refrigerator compartments in a memory of the refrigerator.

20. The method of claim 18, wherein when the terminal communication unit is tagged to the tag unit after implementing the cycle test and selecting to check temperature variation on the terminal, the temperature variation of the freezer and refrigerator compartments is displayed on the terminal display.

* * * * *